United States Patent [19]

Vinciguerra

[11] 4,361,335
[45] Nov. 30, 1982

[54] ANNULAR GASKET FOR STATIC SEALING FOR VERY HIGH TEMPERATURES AND SMALL PRESSURE DROPS, AND METHOD OF MAKING

[75] Inventor: Costantino Vinciguerra, Florence, Italy

[73] Assignee: Nuovo Pignone S.p.A., Florence, Italy

[21] Appl. No.: 257,247

[22] Filed: Apr. 23, 1981

[30] Foreign Application Priority Data

May 6, 1980 [IT] Italy .............................. 21810 A/80

[51] Int. Cl.³ .............................................. F16J 15/08
[52] U.S. Cl. ................................ 277/204; 277/206 R; 277/236; 277/26
[58] Field of Search ................. 277/1, 9, 9.5, 26, 205, 277/206 R, 206 A, 236, 124, 204, 203, 212 C, 219, 220

[56] References Cited

U.S. PATENT DOCUMENTS 2,140,672  12/1938  Gray et al. ........................... 277/1 X
2,259,609  10/1941  Boyd ................................ 277/204 X
2,362,975  11/1944  Comb .............................. 277/206 X
3,207,524   9/1965  Trbovich ........................... 277/206

FOREIGN PATENT DOCUMENTS 462424  11/1913  France ............................... 277/206
888138   1/1962  United Kingdom .................. 277/26

Primary Examiner—Robert S. Ward, Jr.
Attorney, Agent, or Firm—Morgan, Finnegan, Pine, Foley & Lee

[57] ABSTRACT

A seal adapted for environments in which high temperatures are experienced and low pressure drops are met is made by coiling in plural spirals about itself a metallic work-hardened tape which has, in cross-section a shape in the form of an open V, a throat-like recess having a semicircumferential outline being formed in correspondence with the apex of the V. The terminal portions of the spirals are held together by rivets or by spot-welding. A machine is also provided to shape the seal, which comprises specially shaped roller pairs arranged in sequential order, so as to effect on the metal tape all the operations which are necessary to impart the expected final shape thereto.

2 Claims, 9 Drawing Figures

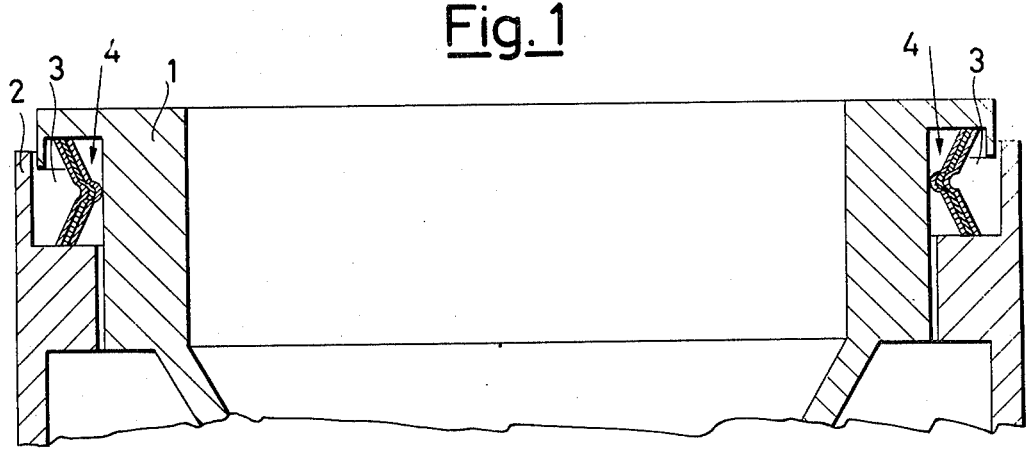
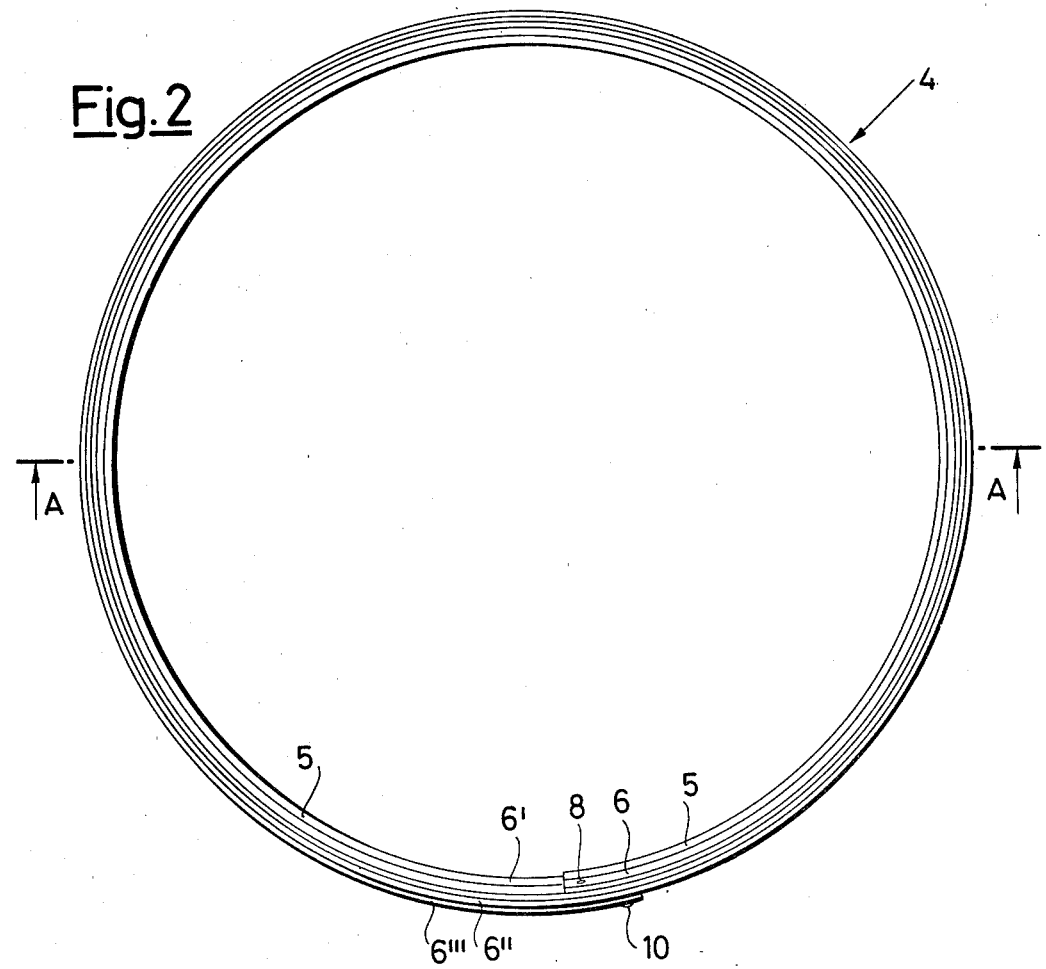

ANNULAR GASKET FOR STATIC SEALING FOR VERY HIGH TEMPERATURES AND SMALL PRESSURE DROPS, AND METHOD OF MAKING

This invention relates to an efficient annular gasket for static sealing for very high temperatures and low pressure differentials, which has a high degree of elastic deformability both in the axial and the radial directions and which can easily and quickly be fabricated at a low cost, with different diameters, also of a considerable size, at the very instant of its use.

The invention also relates to a method for providing such a gasket.

As is known, the annular static sealing gasket for very high temperatures and low pressure differentials is exploited for ensuring a seal between matching mechanical component parts subjected to relative motion relative to each other as due to different thermal expansion of said parts originated by temperature differentials.

It is apparent from the foregoing that a static sealing gasket must be resilient enough as to cope with the mutual displacements of said matching component parts and to compensate such movements.

Now, the present state of the art discloses a number of different kinds of static sealing gaskets for very high temperatures and low pressure differentials. The majority of the conventional gaskets substantially consist of metallic rings or of asbestos reinforced by wires of a costly metal, which, however, due to their having a very low degree of elastic deformability, cannot absolutely be employed whenever such mutual displacements of the matching component parts become important, as is experienced, more particularly, in the field of the gas turbines for aircraft or land vehicles in which, during the start or the stop operations, there are component parts undergoing considerable temperature differentials. Such temperature gradients are experienced in different times in the different component parts which come into contact, due to differences of thickness and different coefficient of heat transfer in the different parts, so that differential expansions are originated in the several matching component parts: these expansions can even be in the order of magnitude of one centimeter in the case of turbines for land vehicles.

At present, in order to allow for considerable mutual dislocations between matching component parts, a special static sealing gasket, called "Belleville" is adopted ("coned-disk spring seal") which is essentially comprised of a metal ring having its circumferential edges sloping towards the ring axis, said ring being inserted in a preloaded condition, that is radially compressed, between the matching component parts concerned.

Such an annular static sealing gasket for very high temperatures and small pressure differentials exhibits, however, a number of drawbacks: the principal defect is substantially due to the circumstance that the gasket, in addition to allowing also for radial, rather than axial, displacements, has a degree of elastic deformability which is not too important, so that only mutual displacement of a comparatively small magnitude can be allowed for, in the order of magnitude of a few tenths of a millimeter, as contrasted with a few millimeters as generally required in the field of use of gas turbines. Another shortcoming is then due to the high cost of the seals, especially if they are to be applied to components having a large diameter, as is generally experienced in the gas turbine field. Furthermore, such a gasket involves considerable difficulties in assemblage since, on account of the requirement that the metal ring must necessarily be opened for being able to introduce it between the matching mechanical components, it becomes necessary, at a later stage, to weld the confronting end edges of the split ring, that which entails a waste of time and an increase of costs. Lastly, inasmuch as such a sealing gasket cannot be provided just at the instant of its application, so that a supply of gaskets of different diameters must be catered for beforehand, this fact also involves problems as to storage and packaging, that which becomes a heavy burden when large size seals are in the question.

Another conventional kind of static sealing gaskets, which enables mutual displacements between matching components which are greater than those to be compensated by the coned-disk seals of the Belleville type aforesaid, is an annular metallic bellows, which is substantially akin to the expansion joints for pipelines and which is inserted between said matching component parts after having previously been axially compressed. Also the latter type of seal does not allow for compensating displacements in the order of those required in the gas turbine field: in addition, it is exposed to all the defects of the coned-disk seals including that of allowing for displacements in a single direction only, the axial direction in the case in point, and originates further difficulties in designing due to its not negligible axial bulk: this is due to the necessity of having two flanges for connecting the respective ends of the metal bellows with the two matching component parts concerned.

An object of the present invention is thus to offset the defects enumerated above by providing, instead, a novel annular static sealing gasket for very high temperatures and low pressure differentials, which happily combines a considerable constructional simplicity, ease of installation and cheapness, with a high degree of elastic deformability both in the axial and the radial directions.

According to a feature of the invention, this object is achieved insofar as said sealing gasket to be inserted between two matching mechanical component parts subjected to relative mutual motion as caused by differential heat expansions, is provided by means of a laminar tape of a work-hardened metallic material which is previously bent and coiled about itself in a plurality of spirals having any preselected diameter, the first and the last of such spirals being stitched by rivets or by spot-welding, said tape being shaped in the form of an open V having its concave surface pointing towards the exterior of such spirals and the apex being pushed rearwards to form a throat-like recess having very much the outline of a circumference.

The advantages of such a static sealing gasket can actually be appreciated at a glance.

In the first place, inasmuch as the gasket is made with a work-hardened metal tape having a thickness of a few tenths of one millimeter, it is extremely lightweight, so that its cost is virtually independent of the selection of the material used.

Consequently, the gasket can be made also with very costly materials, such as 18/8 stainless steels or special alloys for very high temperatures (Monel, Inconel, Nymonic and like others) which make the gasket capable of solving seal problems also in highly corrosive environments such as those experienced in the nuclear installations for the production of enriched uranium by the gas-diffusion process which employ Uranium hexafluoride in gas form or, in general, in the conventional chemical factories.

The cross-sectional outline of the gasket in question makes it, moreover, extremely deformable elastically, both axially and radially and adapted to allow for even considerable mutual displacement between matching component parts, said displacements being in the order of magnitude of a few centimeters. As a matter of fact the shape of the gasket is such that, under an axial compressive stress, it undergoes an axial deformation and a concurrent an elastic radial deformation: these deformations can be in the order of magnitude of a 20% of the width of the metal tape the seal is made of, so that, by appropriately sizing said width, these deformations may attain a value of a few centimeters. Furthermore, the particular shape of the gasket ensures, by virtue of the concave surface pointing outwards relative to the spirals, that the gasket tape may be easily and permanently bent according to different radii of curvature to provide different diameters, also important, in the order of magnitude of 5 meters and over to suit different requirements, while maintaining the cross-sectional outline unaltered: the latter, as outlined above, imparts to the tape a remarkable elastic deformability. The presence of the circumferential throat-like recess, in its turn, fulfills the three-fold task of unhancing the elastic deformability of the tape and thus of the static seal as a whole, ensuring stability of shape on the preselecting diameter, and guiding and centring the several spirals composing the sealing gasket relative to each other.

On the other hand, since the gasket is spirally composed, it is capable of efficiently dissipating pressure differentials under specially unfavorable conditions, with extremely low leakage losses since it is possible to vary the number of spirals, which generally ranges from three to ten in number, consistently with the pressure differentials to be controlled and, in addition, no difficulty is experienced during assemblage because it is merely necessary to stitch the first and the last convolutions, that which can readily be made with simple rivets or by spot welding.

Lastly, an additional asset is the fact that there are no more cumbersome problems as to storage and keeping of ready-made gaskets, since it is only required to have at hand a small set only of laminar tapes of a work-hardened metallic material of different widths, coiled on reels inasmuch as the gasket can now be easily and quickly tailor-made in different, even huge, diameters, just at the very instant of assemblage, by a simple cold shaping operation made with a set of rollers. Thus, on account of the particular cross-sectional outline of the seal, a single operation provides both the final cross-sectional shape of the tape and the curvature which is necessary to provide a sealing gasket of any given diameter. It is possible also to vary the curvature while keeping the cross-sectional outline unaltered, by merely adjusting the roller set.

As a matter of fact, according to another feature of the present invention, the laminar tape of work-hardened metallic material forming the annular static sealing gasket, is previously cumbered to the expected diameter and shaped in the form of said open V having a semicircumferential throat-line recess by a cold-rolling stage, which comprises the step of having said tape passed, while paid off out of a feeding reel and laterally guided by two guiding rollers, through a first couple of centring rollers adapted to engrave a tiny throat-like groove along the central line of the tape, whereafter the tape is passed through a second couple of shaping rollers adapted to impart to the tape a final cross-sectional outline, that is, to bend the tape according to an open V path to provide a circumferential throat-like recess in registry with said previously engraved tiny throat made by the first couple of rollers, and finally through two additional couples of rollers which are the exact counterparts of the rollers of the second couple of rollers, a thrust roller pressing the tape therebetween with an adjustable force which is adapted to impart to the so shaped tape the desired radius of curvature.

It is apparent from the foregoing that the bending or preliminary curvature of the tape is a function only of the magnitude of the force whereby the thrust roller urges the tape so that, by varying said magnitude, it becomes possible readily to vary said preliminary curvature so as to obtain static sealing gaskets of a number of different diameters, and this is achieved without varying the cross-sectional area of the tape in the slightest.

The invention will now be better illustrated with reference to the accompanying drawings which show a preferential practical embodiment showing the best mode to reduce the invention to practice by way of example only and without any implied limitations inasmuch as modifications and changes can be introduced therein of technical, constructional and technological nature without departing from the scope of said invention.

In the drawings:

FIG. 1 is a partial lateral cross-sectional view of two matching mechanical component parts which are subjected to mutual relative movement due to thermal expansion differentials, the sealtightness being provided therebetween by a static sealing gasket for very high temperatures and low pressure differentials made according to the present invention.

FIG. 2 is a plan view of the annular static sealing gasket shown in FIG. 1.

Figure 6:
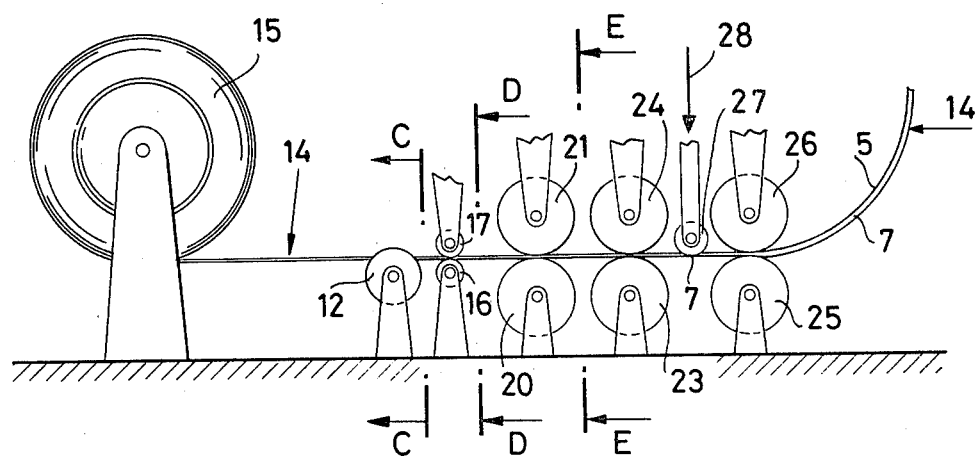

FIG. 6 diagrammatically shows the machine for cold-rolling and preliminary shaping the laminar tape according to the invention.

Figure 7:
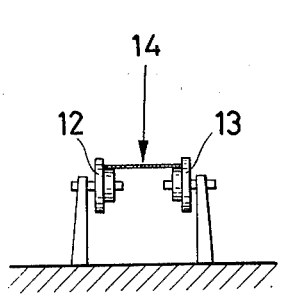

FIG. 7 diagrammatically shows a front view of a detail of the machine of FIG. 6, as viewed along the line C—C of FIG. 6.

Figure 8:
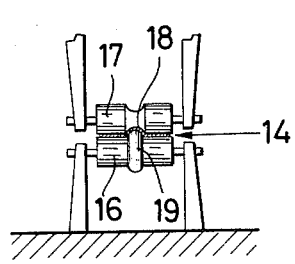
Figure 9:
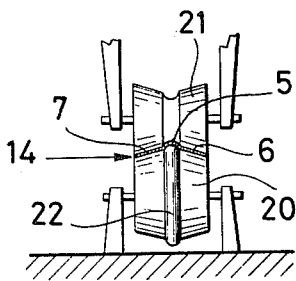

FIG. 8 diagrammatically shows a front view of another detail of the machine of FIG. 6, as viewed along the line D—D of FIG. 6, and FIG. 9 diagrammatically shows a front view of still another detail of the machine of FIG. 6, as viewed along the line E—E of FIG. 6.

Having now reference to the drawings, the reference numerals 1 and 2 indicate, respectively, two mechanical component parts which are matching and are subjected to mutual relative motion due to thermal expansion differentials: in 1 and 2 an annular seating 3 is provided for housing, upon axial compression, an annular static sealing gasket for very high temperatures and low pressure differentials, 4.

Gasket 4 is made with a laminar tape of work-hardened metallic material having a thickness of a few tenths of one millimeter, which, after having been shaped so as to provide along its longitudinal centre line a groove 5 of semicircumferential cross-sectional outline and to have its two webs, 6 and 7, respectively, bent in a direction away of said throat 5 to form an open V (best seen in FIG. 5), is coiled on itself in more spirals (four in the example shown) of the desired diameter, the tape so shaped being bent so that the open V formed by its webs has its concave face pointing towards the outside of the spirals, the throats 5 of the several spirals to be coiled being interlocked with each other.

Figure 3:
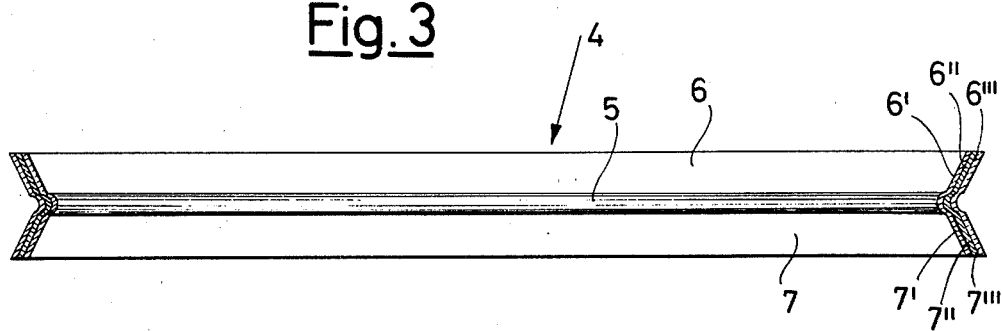
FIG. 3 is a lateral cross-sectional view of the annular static sealing gasket, taken along the line A—A of FIG. 2.
Figure 4:
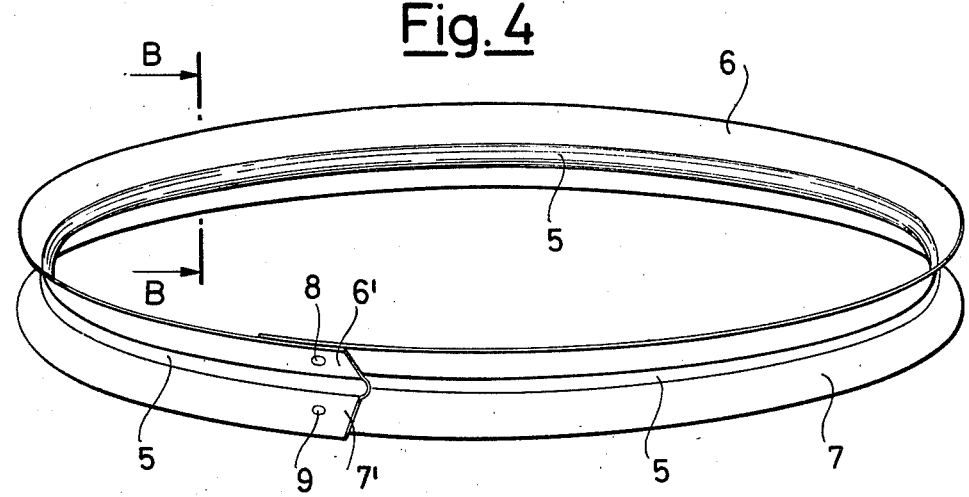
FIG. 4 is a perspective view of the first (starting) spiral of the annular static sealing gasket according to the invention.

The webs 6 and 7, of the first formed spiral are, moreover, stitched to the corresponding webs 6' and 7' of the second spiral being coiled (best seen in FIG. 4) by rivets 8 and 9 or by spot welding, and the same is true of the webs 6'''and 7'''of the last spiral are stitched by rivets 10 (see FIG. 2) or by spot welding, to corresponding webs 6'' and 7'' of the next preceding spiral.

Figure 5:
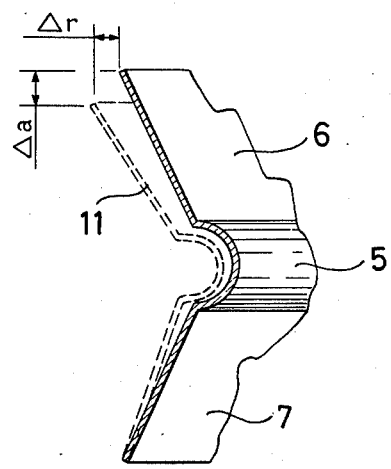
FIG. 5 shows a fragmentary cross-sectional view taken along the line B—B of FIG. 4 and shown in dotted lines the deformation of the laminar tape as caused by an action of axial compression accompanied by radial compression of same gasket.

FIG. 5 then clearly shows that the particular cross-sectional outline of the tape which forms the gasket 4 permits to allow for considerable displacements, both in the axial and the radial directions. As a matter of fact, as a result of a combined action of axial and radial compression of the tape such as occurs as the gasket 4 is inserted in its seating 3, the tape is bent along the dotted line profile of FIG. 5, at 11, and undergoes an axial elastic deformation $\Delta$ a together with an elastic radial deformation $\Delta$ r, which may attain values as high as 20% of the tape width.

On the other hand, in order that the coiling in spirals according to the desired diameter may be encouraged, the laminar tape of work-hardened metallic material, shaped as described hereinabove, is also previously bent to the expected final diameter.

Such a shaping and preliminary bending of the tape is carried out by a single cold rolling step.

FIGS. from 6 to 9 inclusive diagrammatically show a machine which is suitable for the intended purpose.

Said machine essentially consists, in longitudinal array, of two confronting guiding rollers 12 and 13, respectively (best seen in FIG. 7) which support the laminar tape of work-hardened laminar metallic tape 14 exiting the feeding reel 15 and, acting upon the side edges of the tape, guide it through a next couple of centring rollers which are superposedly arranged, 16 and 17, respectively, and pressed against one another in the horizontal direction and adapted to engrave a tiny groove 18 along the centre line of the tape 14. To this purpose, the roller 16 is made with a cylindrical surface having a ridge 19 midway between its ends, whereas the overlying roller 17 is made with its surface which is an exact mirror-image of that of roller 16 (see more particularly FIG. 8). A next following second couple of shaping rollers 20 and 21 is then intended to impart to the tape 14 its final cross-sectional shape, that is, to form the semicircumferential throat 5 in registry with the tiny throat 18 as formed by the centring rollers 16 and 17 and to bend the webs 6 and 7 of the tape 14 in the form of an open V. To this purpose, the shaping roller 20 is made with two frustoconical surfaces mutually connected by a semicircumferential ridge 22 (best seen in FIG. 9) whereas the shaping roller 21 is made with a surface finish which is the accurate mirror-image of the roller 20. Lastly, two additional next couples of rollers, 23-24 and 25-26, respectively, which are the exact counterpart of the second couple of rollers, 20-21, are intended to keep constant the cross-sectional outline of the tape 14 whereas a thrust roller 27, arranged between said two couples of rollers, is caused to press against the tape 14 with an adjustable force 28 so as to bend said tape. By varying the magnitude of such an adjustable force 28, the radius of curvature with which the shaped tape 14 exits the last couple of rollers 25-26 is varied so that it becomes possible to bend the shaped tape 14 beforehand according to any desired diameter.

I claim:

1. An annular static sealing gasket for very high temperatures and low pressure differentials, to be inserted in a preloaded condition between two matching mechanical component parts subjected to mutual relative motion due to differential thermal expansions, characterized in that it is comprised of a laminar tape of a work-hardened metallic material which is previously bent and coiled about itself in plural spirals of the desired diameter, the first and the last of such spirals being stitched by rivets or spot-welding, said tape being shaped in the form of an open V having its concave face pointing towards the outside of said spirals and its apex extending rearwards so as to form a throat-like recess having a substantially semicircumferential outline.

2. An annular static sealing gasket according to claim 1, characterized in that said laminar tape of a work-hardened metallic material is previously bent according to the desired diameter and shaped in conformance with said open V having a semicircumferential throat-like recess by a cold-shaping operation by means of rollers, comprising the steps of having said tape, paid off by a feeding reel and laterally guided by two guiding rollers, passed through a first couple of centring rollers adapted to engrave a tiny throat-like groove along the centre line of said tape, then through a second couple of shaping rollers adapted to impart to the tape the final shape in cross-section, that is, to bend the tape along an open-V outline and to provide a semicircumferential throat-like recess in registry with said tiny throat-like groove engraved by said first couple of rollers, and lastly through two additional couples of rollers which are the exact counterparts of those of said second couple, a thrust roller therebetween pressing onto the tape with an adjustable force adapted to impart a curvature as desired to said shaped tape.

* * * * *